May 20, 1941.   N. J. PRITCHARD ET AL   2,243,016
OPERATING MECHANISM FOR WINDSCREEN WIPERS
Filed Dec. 18, 1939    2 Sheets-Sheet 1

Inventors:
N. J. Pritchard
and C. W. Walters,
By E. F. Wenderoth
atty

May 20, 1941.    N. J. PRITCHARD ET AL    2,243,016
OPERATING MECHANISM FOR WINDSCREEN WIPERS
Filed Dec. 18, 1939    2 Sheets-Sheet 2

Inventors;
N. J. Pritchard
and C. H. Walters
By C. F. Wendcroth
Atty

Patented May 20, 1941

2,243,016

UNITED STATES PATENT OFFICE 2,243,016

OPERATING MECHANISM FOR WINDSCREEN WIPERS

Norman John Pritchard, Mosman, near Sydney, New South Wales, and Claude William Walters, Lane Cove, near Sydney, New South Wales, Australia; said Walters assignor to said Pritchard Application December 18, 1939, Serial No. 309,878 In Australia January 7, 1939

4 Claims. (Cl. 74—209)

This invention has for its object to provide a wind screen wiper directly driven mechanically by a rotary element associated with the engine of an automobile and including improved means for automatically governing the rate of oscillation of the wiper arms so that that rate will be maintained constant irrespective of variation in the speed of the driving element, said governing means being adjustable for changing the oscillation rate to suit the driver's judgment.

The initial drive is taken from the radiator fan belt by a pulley which is carried on a spring hung pivotal arm. That arm is connected by a Bowden wire to a pull button on the instrument board of the car; by movement of this button the arm may be swung to cause the pulley face to come into or out of contact with the fan belt. A Bowden type flexible shaft is connected to or is geared at the forward end of it to the drive pulley spindle and its rear end is connected to a worm which is meshed with a worm wheel; a driver rack which is driven by a crank converts the worm wheel rotations into oscillatory movement of a pinion which is fixed on the wiper blade shaft.

The pulley is a hollow drum which contains a centrifugal control slipping friction clutch which operates to slow the transmission when a certain speed is exceeded by the engine and so maintain a constant oscillation speed applied to the wiper arm. Alternative designs of slipping clutch are provided. In one of them clutch shoes are carried on the driven element; in the other clutch shoes are carried on the drum.

In the former case the drum, which takes drive from the fan belt, contains a cone collar concentrically within it. The Bowden flexible shaft end is connected to a disc within the drum; this disc carries a plurality (preferably eight) of weighty pivotal knuckle arms which are constrained inward to bear frictionally on the face of the cone collar by a single convolution of spring wire which encircles the group of arms. The normal circle of contact of these knuckle arms with the cone is adjusted by means of a cone pointed screw by which the disc which carries them may be forced more or less towards the cone so that the knuckles will be caused by the spring to bear with greater or less pressure on the cone surface. At low or normal speed of the engine, the knuckles do not slip on the cone, but when the engine speed exceeds a predetermined rate, centrifugal action operates to force the knuckles outward against the restraint of the spring, so that their frictional contact with the cone is eased and slip occurs. The rate of oscillation of the wiper arms is thus adjusted by alteration in the cone point screw setting to approximate to uniformity at all speeds of the engine, above a low rate.

In the alternative arrangement, the clutch shoes are fixed in centrifugal arms which are pivotally hung in the drum, and contact operatively with the periphery of a non-rotating ring which is held on the bearing in which the drum spindle rotates. When this contact occurs the pulley and the whole assembly within it are caused to swing on the pivot outwardly from the belt and the transmission rate is thus reduced as slip then occurs between the pulley face and the belt.

In both arrangements speed regulation is variable and is effected by centrifugal movement of clutch shoes, in both cases the transmission being slipped more or less as the engine speed increases beyond the set standard rate.

In the accompanying drawings—

Figure 1:
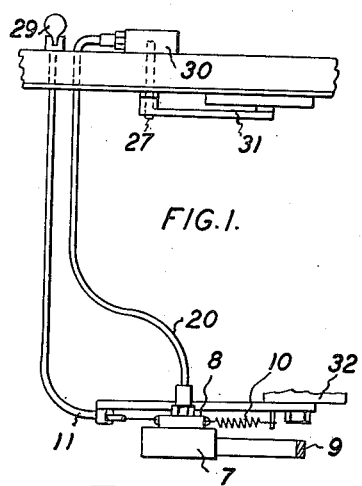
Fig. 1 shows the general assembly.
Figure 2:
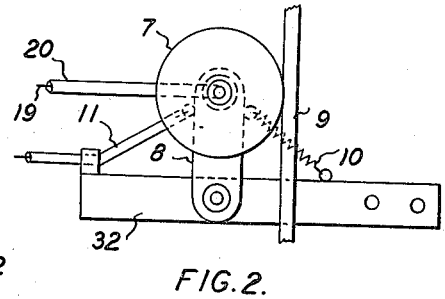
Fig. 2 shows diagrammatically the pulley and the fan belt detail.
Figure 5:
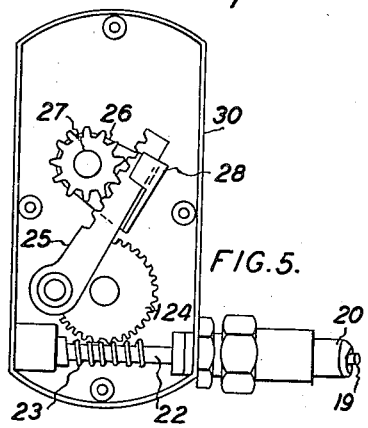
Fig. 5 shows the oscillating drive arrangement for the wiper arms.
Figure 6:
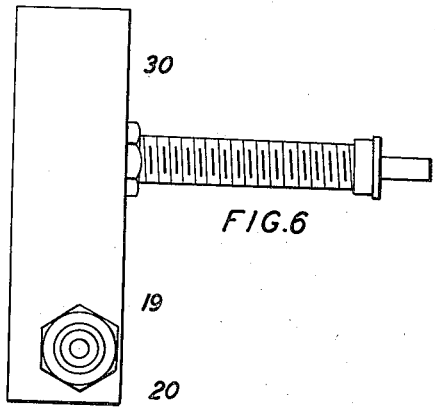
Fig. 6 is a side elevational view of the drive arrangement shown in Fig. 5.
Figure 3:
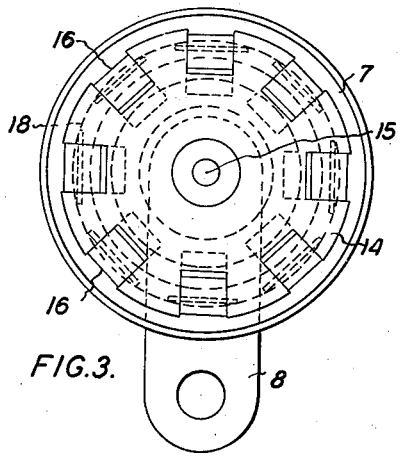
Fig. 3 is an end elevational view of the pulley.
Figure 4:
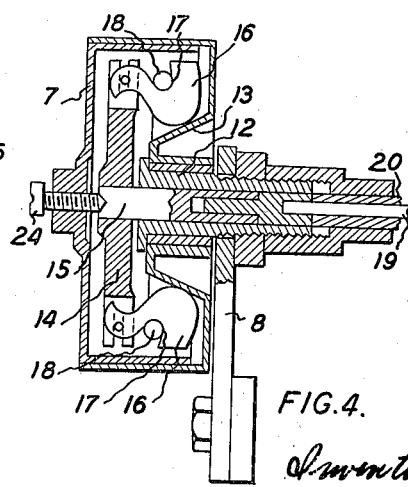
Fig. 4 is a vertical axial section through the pulley, showing the clutch design.

Referring to Figs. 1 to 6, the drum pulley 7 is a telescoped metal stamping, the outer member forming a re-entrant internal cone 13, the neck of which is freely rotatable on the bush 12 on the axle which is carried by the swing link 8 which is pivotally mounted on the bracket 32. That link is normally constrained by a spring 10 to bring the drum periphery to contact with the outer face of the radiator fan belt 9, 11 being a Bowden wire which is led from a control button 29 on the instrument board of the car. By means of this control the link 8 may be pulled back so as to move the drum out of peripheral contact with the fan belt.

The pulley drum 7 drives the Bowden flexible cable 19 through the centrifugal knuckles 16 which are hung in the periphery of a disc 14, to the spindle 15 of which the end of the Bowden cable 19 is keyed in the usual way. 18 is a single convolution of spring wire which is banded round the group of knuckles 16 constraining them inward so as to bear with more or less friction on the face of the cone 13. 24 is a regulating screw with hard cone point which bears against the disc centre 14, forcing the disc towards the cone 13 in opposition to the influence of the spring 18.

At low and normal engine speeds the knuckles 16 frictionally contact with the cone face 13 and the Bowden flexible shaft 19 is driven without slip. When, however, the engine speed is increased above that at which the flexible shaft 19 would drive the wiper arms on the car windshield at the desired rate of oscillation, the knuckles 16 are influenced by centrifugal action to ease their frictional contact with the cone 13; slip then occurs and the rate of rotation of the Bowden flexible shaft 19 is reduced so that it does not exceed the desired rate. The bracket arm 32 is fixed to any convenient standing part of the car engine structure.

Figure 7:
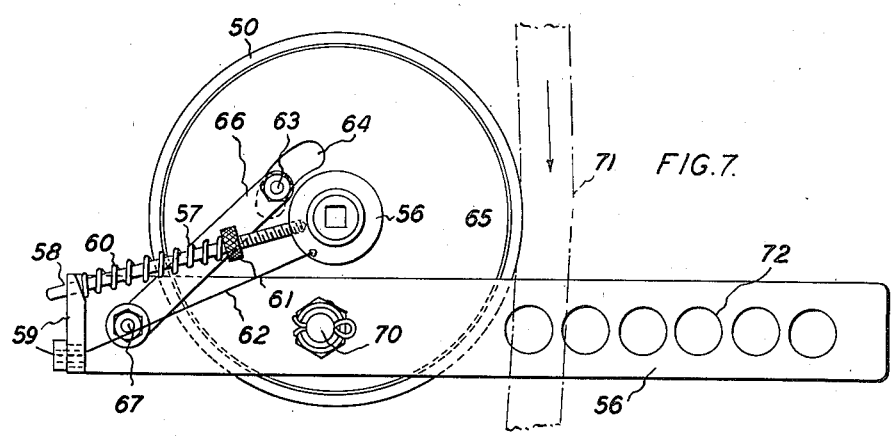
Fig. 7 is an end elevational view showing the drum periphery in driving contact with the radiator fan belt.
Figures 8, 9:
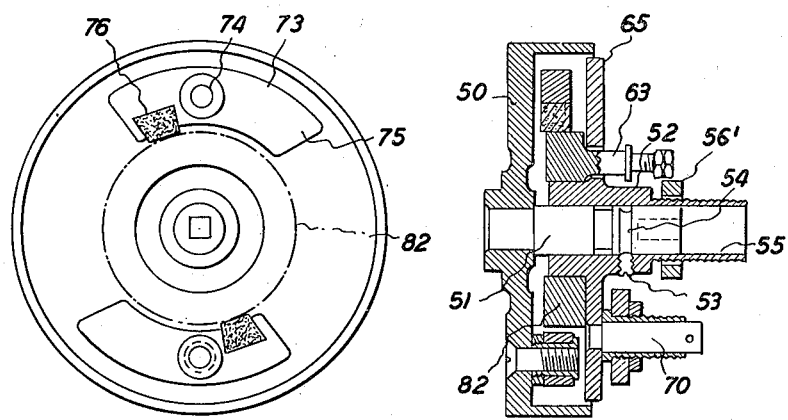
Fig. 8 is an internal end elevational view of the drum with the centrifugal arms and clutch shoes thereon within it.
Fig. 9 is a vertical longitudinal section through the drum, the ring with which the centrifugal shoes coact, and the drum bearing.

Referring to Figs. 7 to 9, the pulley 50 is fixed on the end of the key spindle 51 with which the key on the forward end of the Bowden cable is engageable. This spindle is rotatable in a bearing 52 which is integral with the cover disc 65 on the open end of the pulley 50. This spindle is located endwise in the bearing by a grub screw 53 which engages a groove 54 turned in the spindle. The tail portion 55 of the bearing is screwed to take the union of the Bowden cable casing tube. 56¹ is a loose collar on the bearing tail 55. One end of a rod 57 is screwed into this collar, and the other end of this rod 57 works freely through a bearing hole 58 in the heel piece 59 on the bracket 56. 60 is a helical spring in compression sleeved over the rod 57, abutting against the bracket heel 59 and bearing against an adjusting nut 61. 62 is a Bowden pull wire which connects a control button on the car instrument board with the collar 56¹. 82 is a ring on the inner end of the bearing 52. A stud 63 integral with this ring projects out through an arcuate slot 64 in the cover disc 65. A stay arm 66 connects this stud 63 with a pivot 67 which is fixed to the bracket 56. 72 are bolt fixing holes in the bracket 56. One or more rock arms 73 are pivotally mounted on studs 74, which are fixed in the end of the pulley. One end 75 of each of these arms is heavier than its other end, and in the light end a shoe 76, preferably of cork, is set in contact relation to the periphery of the ring 82.

The assembly just described is mounted on the side of the bracket 56 by a pivot stud 70 and it is movable about that stud to bring the periphery of the drum 50 into or out of contact with the fan belt 71.

When the engine is rotating at slow speed or at normal speed, the periphery of the pulley 50 has a full bearing against the back of the fan belt 71, being forced towards the belt by the spring 60, the tension being adjusted by the nut 61. When the Bowden wire 62 is pulled, the pulley is swung back about the stud 70 from the fan belt and then rotation is not applied to it by the belt. This lateral movement of the pulley is permitted by the arcuate slot 64. If whilst the pulley is in contact with the fan belt the engine speed is increased beyond a predetermined rate, the arms 73 tilt obediently to centrifugal action bringing the friction shoes 76 into contact with the ring 82 and causing the drum to be dragged backward from the belt 71, as it is influenced to tilt backward on its point of pivotal support on the stud 70 by the drag of the shoes 76 on the periphery of the ring 82. The pulley is thus prevented from rotating at an undesirably high rate.

The mechanism by which rotation of the flexible shaft 19 is transformed and applied as oscillation movement to the wiper arm spindle 27 is not in itself a part of the invention. The end of the flexible shaft 19 is key connected to the spindle 22 of a worm 23 which is meshed with a worm wheel 124. A rack crank 25 on the worm wheel 124 works in a swing guide 28 and meshes with the pinion 26 which is fixed to the rock spindle 27 of the wiper arm 31.

What is claimed is:

1. In operating mechanism for windscreen wipers, the combination with a driving element actuated by a prime mover, and a driven element coupled to wiper blade oscillating devices, of means for transmitting rotary motion to said driven element from said driving element whereby the speed of said driven element is prevented from exceeding a selected speed, said means comprising, a pulley, a drive spindle upon which said pulley is fixed, means enabling drive connection of said spindle to said driven element, a sleeved member mounted on said spindle, a non-rotatable friction ring freely mounted on said sleeved member, a plurality of out-of-balance rock arms which are pivoted on said pulley and which are adapted to contact said friction ring, an eccentric pivot support for said sleeved member, and spring means whereby said sleeved member is influenced to move about its said pivot support towards said driving element.

2. In operating mechanism for windscreen wipers, the combination with a driving element actuated by a prime mover, and a driven element coupled to wiper blade oscillating devices, of means for transmitting rotary motion to said driven element from said driving element whereby the speed of said driven element is prevented from exceeding a selected speed, said means comprising, a hollow pulley having one open end, a drive spindle upon which said pulley is fixed, means enabling drive connection of said spindle to said driven element, a centrally sleeved cover disc mounted on said spindle and filling the open end of said pulley, a non-rotatable friction ring freely mounted on said sleeved cover disc within said pulley, a plurality of out-of-balance rock arms which are pivoted on and within said pulley and which are adapted to contact said friction ring, an eccentric pivot support for said cover disc, and spring means whereby said disc is influenced to move about its said pivot support towards said driving element.

3. Mechanism according to claim 1 which includes means for moving said pulley from driving engagement with said driving element.

4. In operating mechanism for windscreen wipers, the combination with a driving element actuated by a prime mover and a flexible driven shaft coupled to wiper blade oscillating devices, of means for transmitting rotary motion to said driven shaft from said driving element whereby the speed of said driven shaft is prevented from exceeding a selected speed, said means comprising a hollow pulley having one open end, a drive spindle upon which said pulley is fixed, means enabling drive connection of said spindle to said driven shaft, a centrally sleeved cover disc mounted on said spindle and filling the open end of said pulley, a friction ring freely mounted on said sleeved cover disc within said pulley, a stud on said friction ring which projects through a slot formed in said cover disc, a support bracket, a stay arm pivoted to said stud and to said bracket, a pair of out-of-balance rock arms which are pivoted on and within said pulley and which are adapted to contact said friction ring, an eccentric pivot stud fixed to said cover disc, a bearing for said pivot stud in said bracket, a collar loosely mounted on a portion of said cover disc, a threaded rod fixed to said collar, a nut on said rod, a bearing for said rod in said bracket, a spring sleeved on said rod, and a pull wire having one end anchored to said collar.

NORMAN JOHN PRITCHARD.
CLAUDE WILLIAM WALTERS.